United States Patent Office 3,726,716
Patented Apr. 10, 1973

3,726,716
ORGANIC ELECTROLYTES FOR BATTERIES
Lee F. Athearn, Reading, and Charles C. Liang, Andover Mass., assignors to P. R. Mallory & Co., Inc., Indianapolis, Ind.
No Drawing. Filed Dec. 16, 1970, Ser. No. 98,950
Int. Cl. H01m 11/00, 17/02
U.S. Cl. 136—100 R       5 Claims

ABSTRACT OF THE DISCLOSURE

A high energy density electric cell has a light metal anode and an organic electrolyte containing an additive comprising a metal salt, the metal of which is an ion of a metal less reactive than lithium. This additive shows superior ability in removing passive film formed on the anode; and the additive includes metal chloride salts selected from the group consisting of $NiCl_2$, $MgCl_2$, $ZnCl_2$, $HgCl_2$, $PbCl_2$, $CdCl_2$, $TlCl$ and the mixtures thereof.

---

This invention relates to organic electrolytes and more particularly to organic electrolytes for use in combination with light metal anodes.

High energy density cells are known to use highly electropositive light metals, such as alkali metals or alkaline earth metals, which are combined with organic solvent electrolytes containing dissolved conductive salts substituted for the customary aqueous electrolyte. In these cells various active cathode materials such as metal oxides, metal halides, and metal sulfides are employable.

While various organic solvents may be employed in such organic electrolyte cells, a group of solvents having a particularly high degree of compatibility with the cell anode and active cathode materials has been determined to include tetrahydrofuran, butyrolactone, propylene carbonate, dioxolane and the mixtures thereof. Furthermore, while many conductive salts may be employed to render these organic solvents electrolytically conductive, it has been determined that the light metal perchlorates are preferable to achieve a high degree of compatibility among all cell constituents.

There has been observed in light metal anode organic electrolyte cells, a tendency for deleterious chemical and electrochemical reactions to occur yielding many reaction products. A readily noticeable result of the presence of these reaction products is the passivation of the anode, or the deactivation of the anode due to a passive film formed on the anode by reaction with the electrolyte and/or with the cathode during shelf life storage of the battery.

It is an object of the present invention to increase the shelf life of organic electrolyte cells.

It is a further object of the present invention to inhibit the effectiveness of reaction products formed in the cell electrolyte by chemical or electrochemical reactions to cause anode passivation.

It is a further object of the present invention to permit storage of organic electrolyte cells at storage temperatures above room temperature up to about 55° C.

It is a further object of the present invention to permit maximum discharge output of organic electrolyte cells at discharge temperatures below room temperature ranging down to about —30° C. with excellent capacity recovery.

The foregoing and other objects of the invention will be evident from the following detailed description of the invention and in the appended claims.

Generally speaking, the present invention relates to an additive for organic electrolyte cells comprising a metal salt, a metal chelate salt, or a metal chloride salt of which the metal is a single inorganic cation of a metal less reactive than lithium. Included within the operable group of chloride additives are the following anhydrous metal chlorides: $NiCl_2$, $MgCl_2$, $HgCl_2$, $ZnCl_2$, $PbCl_2$, $CdCl_2$, $TlCl$ and the mixtures of these compounds. The amount of each additive will vary between about 0.01 gram to about 1.01 grams per 100 milliliters of electrolyte depending upon the quantity needed to yield a saturated solution of the particular metal salt additive in any given electrolyte.

Where an anode comprises a light metal, such as lithium it is known to utilize organic electrolytes to produce batteries that can be stored for long periods of time at temperatures up to about 55° C. These electrolytes due to their low freezing point, permit discharge of the battery cells at temperatures ranging down to about —30° C. with resonable capacity recovery.

The discharge of these batteries at temperatures of about —30° C. after extended shelf storage at temperatures above room temperature up to about 55° C. was found to be limited by high IR losses. This high IR loss was found to be caused by a passive film formed on the anode by reaction with the electrolyte during storage. However, it appears that batteries using electrolytes that do not form this passivating film on the lithium anodes do not withstand shelf storage at temperatures of about 55° C. Thus this passivating film serves the useful purpose of protecting the anode during storage; but it must necessarily be removed before or soon after the initial use of the battery.

The basic electrolytes that were employed for lithium anode batteries were tetrahydrofuran, butyrolactone, propylene carbonate, dioxolane and their mixtures in various ratios. In these solvents lithium perchlorate was dissolved to make a one molar solution. These solutions provide electrolytes for batteries using lithium anodes that will be stable at storage temperatures up to 55° C. and above and that will be operable at temperatures down to —30° C. and below. Nevertheless, these batteries also exhibited the capacity losses caused by passive film formation described above.

It has been discovered that when various anhydrous metal salts, metal chelate salts, and metal chloride salts such as $NiCl_2$, $MgCl_2$, $HgCl_2$, $ZnCl_2$, $PbCl_2$, $CdCl_2$, $TlCl$ and combinations or mixtures of these were added to the above electrolytes prior to cell assembly, the passive film which subsequently is formed apparently due to the high temperature shelf storage characteristics of the electrolytes is nevertheless easily removed or penetrated during the initial discharge of the cell. While the quantity of each metal salt, or of each mixture of metal salts, added to the electrolyte is dependent upon the amount necessary to saturate the solution, this quantity ranged from about 0.01 gram per 100 milliliters of electrolyte to about 1.01 grams per 100 milliliters of electrolyte.

Each of the above additives is an inorganic metal salt. The metal while being the ion of a metal less reactive than lithium is specifically a single inorganic cation of a metal less reactive than lithium. Six of the metals involved are Ni, Mg, Hg, Zn, Pb, and Cd, each of which is divalent, while the seventh metal is monovalent Tl.

As stated above each of these metals possesses the characteristic of being the ion of a metal less reactive than lithium; i.e.—the specific metal is below lithium in the electromotive series and therefore the specific metal has a lesser tendency to react chemically or to lose electrons than does lithium.

The additives may be added to the electrolytes prior to cell assembly; or in the alternative the additive or additives may be incorporated into the cathode mix as described hereinbelow. Usually the cathode mix comprises an active cathode ingredient powder such as a metal oxide, metal halide, or metal sulfide and an electrically conductive chemically inert filler powder such as graphite. Into this mixture is incorporated enough of one powdered additive or enough of a mixture of powdered additives to insure a saturated solution of the additive in the electrolyte. The cathode mix containing the additive is homogenized into a uniform distribution which is then pressed into a shaped electrode structure either self-supporting or supported by a conductor grid structure, composed of a material such as nickel.

The following examples were prepared and run under the following conditions; in each sample the anode was lithium, the cathode comprised $MoO_3$ plus graphite, and the conductive salt dissolved in the organic electrolyte was one molar lithium perchlorate $LiClO_4$.

| Sample | Organic electrolyte [1] | Amount of additive [2] |
|---|---|---|
| 1 | 50%THF:25%BL:25%PC | 1.0 gm. $HgCl_2$. |
| 2 | Same as above | 0.1 gm. $MgCl_2$. |
| 3 | do | 0.15 gm. $ZnCl_2$. |
| 4 | do | 0.1 gm. $NiCl_2$. |
| 5 | do | 0.01 gm. $CdCl_2$. |
| 6 | do | 0.2 gm. $PbCl_2$. |
| 7 | do | 0.02 gm. $TlCl$. |
| 8 | do | 0.01 gm. $NiCl_2$ and 1.0 gm. $HgCl_2$. |
| 9 | 50%THF:50% dioxolane | 0.1 gm. $NiCl_2$. |
| 10 | 50%THF:25%BL:25%PC | Control sample, no additive. |

[1] "THF" is tetrahydrofuran; "BL" is butyrolactone; "PC" is propylene carbonate.
[2] The weight of each sample additive is expressed in grams per 100 milliliters of electrolyte.

After each of the above ten samples were prepared, an appropriate number of sample cells were constructed and were then subjected to the following seven test conditions:

(I) Immediate discharge at −30° C.; no storage
(II) Immediate discharge at 25° C.; no storage
(III) One week storage at 55° C.; discharge at −30° C.
(IV) One month storage at 55° C.; discharge at −30° C.
(V) Three months storage at 55° C.; discharge at −30° C.
(VI) Three months storage at 45° C.; discharge at −30° C.
(VII) Three months storage at 25° C.; discharge at −30° C.

The results of these seven test conditions may be categorized and summarized as follows. Under test conditions (I) and (II), there was no formation of a passive film because the storage time was essentially nil. The output capacity was accordingly essentially the same either with or without the metal chloride additive.

Under test conditions (III) to (VII) the higher temperature storage at 25° C. to 55° C. without the additive for periods of one week to three months produced very unsatisfactory discharge capacity results at −30° C. These results were on the order of 10% of those obtained by immediate discharge at −30° C. without storage. However, when cells containing the metal chloride additives were tested according to conditions III to VII the output capacity was on the order of 70% to 80% of that obtained by the immediate discharge at −30° C. without storage.

From the above it can be seen that the invention described a simple, economic, high capacity output electric cell for efficient operation at temperatures down to −30° C. after having been stored at temperatures up to 55° C.

While the invention is illustrated and described in its preferred embodiments, it will be understood that modifications and variations may be affected without departing from the scope of the novel concepts of this invention.

What is claimed is:

1. An organic electrolyte cell comprising a lithium anode, a cathode active material comprised of $MoO_3$ in combination with a metal salt or a metal chelate salt additive thereto, wherein said metal is a single inorganic cation of a metal less reactive than Li, and wherein said additive is an inorganic metal chloride selected from the group consisting of $NiCl_2$, $MgCl_2$, $HgCl_2$, $ZnCl_2$, $PbCl_2$, $CdCl_2$, $TlCl$, and the mixtures thereof; and an organic electrolyte comprising an organic solvent and having a dissolved salt therein, said salt rendering said solvent electrolytically conductive.

2. An organic electrolyte cell as in claim 1 wherein the organic solvent is selected from the group consisting of tetrahydrofuran, butyrolactone, propylene carbonate, dioxolane and the mixtures thereof.

3. An organic electrolyte cell as in claim 2 wherein the dissolved salt is lithium perchlorate.

4. An organic electrolyte cell as in claim 1 wherein said inorganic metal chloride additive ranges from about 0.01 gram to 1.01 grams per 100 milliliters of said electrolyte to yield a saturated solution of the additive.

5. In an organic electrolyte battery containing a lithium anode, a cathode electrode therefor comprised of $MoO_3$ in combination with an additive comprising a metal salt or a metal chelate salt wherein said metal is a single inorganic cation of a metal less reactive than Li, and wherein said additive is an inorganic metal chloride selected from the group consisting of $NiCl_2$, $MgCl_2$, $HgCl_2$, $ZnCl_2$, $PbCl_2$, $CdCl_2$, $TlCl$, and the mixtures thereof.

References Cited
UNITED STATES PATENTS

| 3,547,703 | 12/1970 | Blomgren et al. | 136—155 |
| 3,380,855 | 4/1968 | Mahy et al. | 136—155 |
| 3,410,730 | 11/1968 | Rightmire et al. | 136—120 R |

DONALD L. WALTON, Primary Examiner

U.S. Cl. X.R.
136—137, 155